United States Patent [19]

Savord

[11] Patent Number: 4,700,573
[45] Date of Patent: Oct. 20, 1987

[54] METHOD TO IMPROVE ACCURACY IN DELAY LINES

[75] Inventor: Bernard J. Savord, Ithaca, N.Y.

[73] Assignee: Hewlett-Packard Company, Palo Alto, Calif.

[21] Appl. No.: 837,486

[22] Filed: Mar. 7, 1986

[51] Int. Cl.$^4$ .................. G01N 29/00; G01L 25/00
[52] U.S. Cl. ........................ 73/625; 73/1 DV
[58] Field of Search ............. 73/1 DV, 626, 625; 367/13, 122, 123

[56] References Cited

U.S. PATENT DOCUMENTS

| | | | |
|---|---|---|---|
| 4,140,022 | 2/1979 | Maslak | 73/626 |
| 4,334,432 | 6/1982 | Gill | 73/625 |
| 4,446,740 | 5/1984 | Wilson et al. | 73/625 |

OTHER PUBLICATIONS

Rumbold, "A New Approach to Calibrating for Distance Amplitude Correction and Ultrasonic Inspection", Technical Paper, 1979.

Primary Examiner—Stewart J. Levy
Assistant Examiner—Robert R. Raevis
Attorney, Agent, or Firm—Donald N. Timbie

[57] ABSTRACT

The errors in phase produced by differences in the locations of taps on a delay line are compensated by determining the error by transmitting oscillations from a test oscillator through each tap and storing the difference between the actual phase and the ideal phase that would result if the taps were perfectly located. When an ideal delay is called for, the tap having the closest actual delay to the ideal delay is selected and the proper phase correction is made.

3 Claims, 2 Drawing Figures

METHOD TO IMPROVE ACCURACY IN DELAY LINES

BACKGROUND OF THE INVENTION

In certain ultrasound imaging systems, pulses of several sinusoidal pressure waves are successively transmitted by each transducer of an array into a body under examination so as to form a beam along a path in a direction determined by the relative times at which the transducers of the array are excited. Reflection of these pressure waves from targets located in the beam impinge on the individual transducers and cause them to produce corresponding electrical waves. Because of the different distances between a target and each of the transducers, the electrical waves they produce in response to pressure waves reflected from the target are not in phase, so that summing the electrical waves would produce a signal of very low amplitude. If, however, a delay is connected to each transducer that exactly compensates for the differences in time it takes for the reflections to go from the target to each transducer, corresponding sinusoids of the pulse will be cophasal, and a summation of these cophasal waves will produce a strong signal. Because a different delay must be provided for each target range along each beam path, the number of delays required is great and their cost is excessive.

In U.S. Pat. No. 4,140,022 issued on Feb. 20, 1979, to Samuel B. Maslak and assigned to Hewlett-Packard Company, an ultrasound system is described in which the cost of providing the delays is considerably reduced. Instead of providing the many delays that are required to cause the pulses of electrical waves produced by the transducers to occur at the same time so that corresponding sinusoids within the pulses are all in phase, fewer delays are provided so that, although the pulses do not arrive at the same time, they do have some overlap. Each transducer is connected to one input of its own mixer and the output of the mixer is connected by a tap selector to a tap on a master delay line. The other input of each mixer is connected to a phase selector that provides the phase of a common local oscillator signal that is required to bring the sinusoids of the intermediate frequency at the outputs of the mixers which occur during the overlapped portions of the pulses into approximate phase coherence at the output of the master delay line. A strong signal is attained when these signals are summed. In order to secure the required degree of phase coherence, however, it is essential that the tolerance of the locations of the taps on the master delay line be such that errors in the delays provided by the taps are within a small fraction of a period of the intermediate frequency wave of the delay they are supposed to provide. This is so because the phases of the intermediate frequency provided by the mixers is based on the assumption that the locations of the taps are ideal.

BRIEF SUMMARY OF THE INVENTION

In accordance with this invention, the differences between the phase that the intermediate frequency has when it passes through a signal path provided by each tap of the master delay line and the phase it would have if each tap were precisely located are respectively stored, and the difference between these phases are respectively used to control a phase-changing means connected in series with each tap so as to tend to compensate for errors in the delay actually provided by the tap.

DETAILED DESCRIPTION OF THE INVENTION

Figure 1:
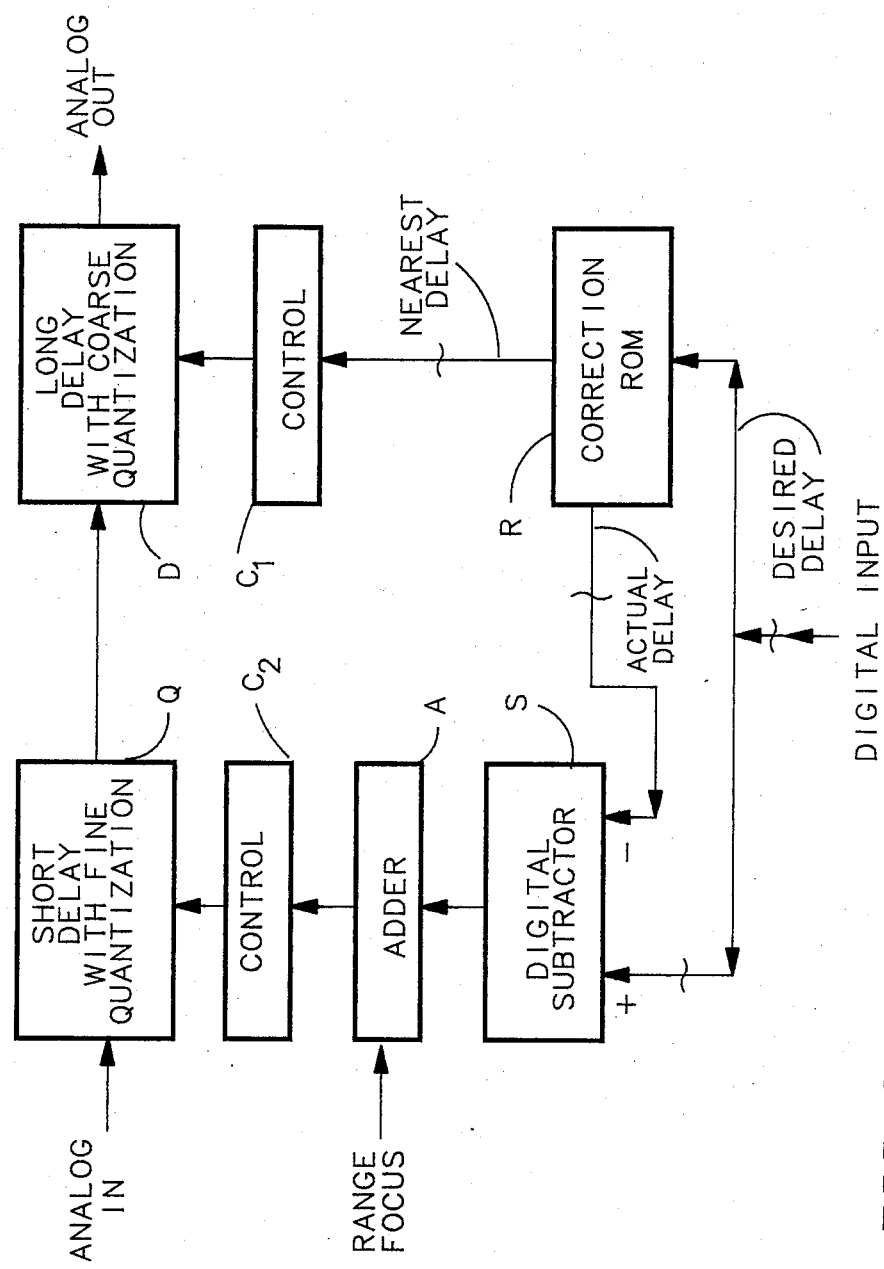
FIG. 1 is an overall functional block diagram for apparatus incorporating this invention.

In FIG. 1, an analog signal to be delayed by a precise amount is applied via a finely quantized phase shifting means Q to a coarsely quantized delay D. The desired delay for the analog signal is applied to a ROM R that is preloaded so as to cause a control $C_1$ to cause the delay D to introduce into the path of the analog signal the one of its coarsely quantized delays that is closest to the desired delay. The ROM R is preloaded with measured values of each of the coarsely quantized delays, and the difference between the actual quantized delay selected in any given instance and the desired delay is derived by a subtractor S and supplied to an adder A. Also provided to the adder A is a signal indicating the phase shift that would be required for range focussing as described in the aforesaid patent if the delay provided by D is the same as the desired delay. The output of the adder A is applied to a controller $C_2$ that selects the finely quantized phase provided by the phase-shifting means Q that will cause the effective delay introduced into the signal path by Q and D to be satisfactory even though the delays provided by D contain errors.

Figure 2:
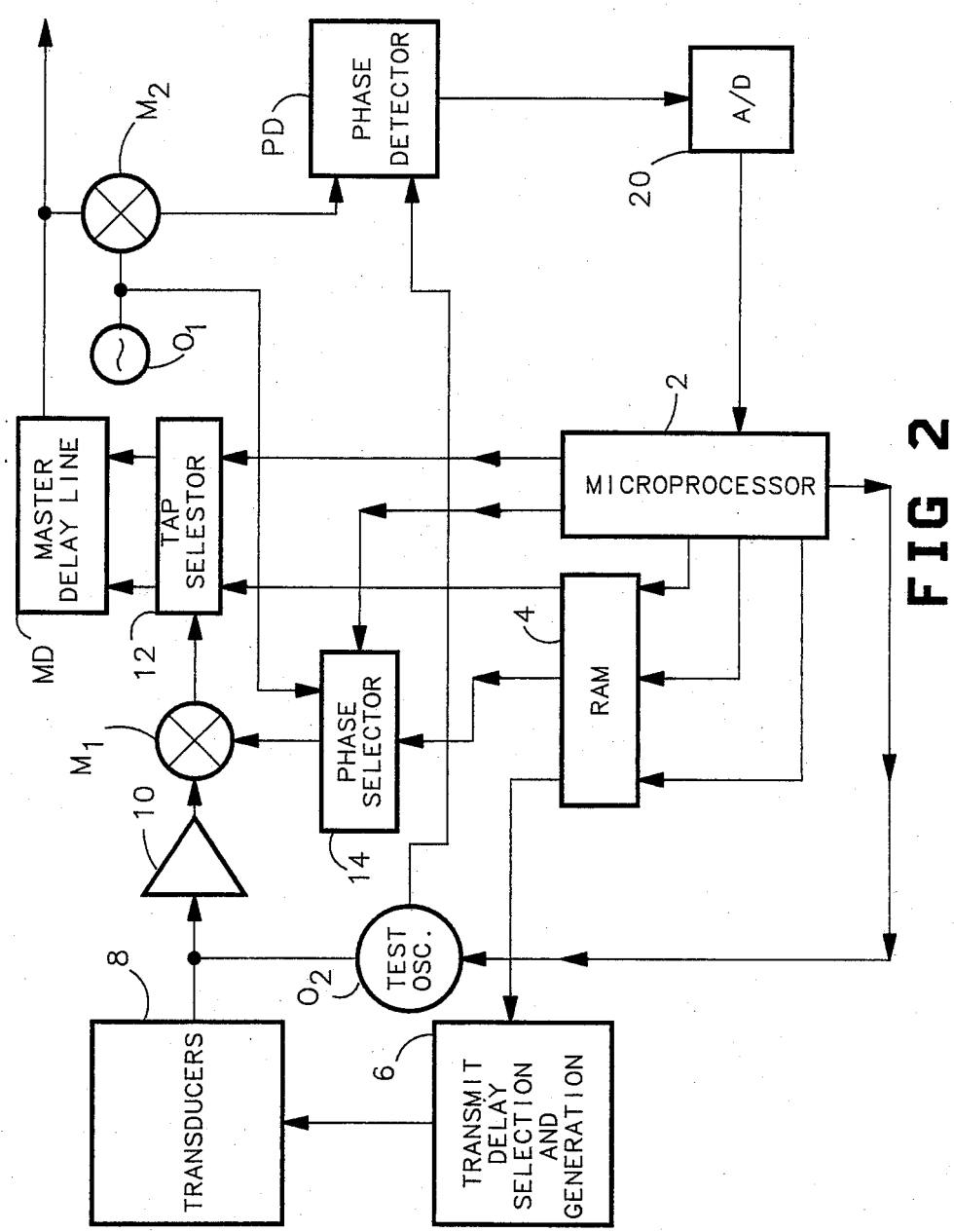
FIG. 2 is a block diagram illustrating the incorporation of this invention into a system such as described in the aforesaid U.S. Pat. No. 4,140,022.

FIG. 2 illustrates one way of incorporating the invention into a pulsed ultrasound system. The normal operation is as follows. A microprocessor 2 informs a RAM 4 of the angle at which an acoustic beam of pulses of sinusoidal pressure waves is to be launched into the body of a patient and, in response to this information, a device 6 respectively provides pulses to transducers contained in a block 8 having a relative timing necessary to cause the acoustic beam to be launched in the desired direction. When reflections of an acoustic pulse arrive at each transducer, it outputs corresponding electrical pulses. The processing of the output of only one transducer in the block 8 is now shown and described, but the outputs of the other transducers will be processed in the same manner.

The output of a transducer is applied via an amplifier 10 to one input of a mixer $M_1$, and the output of the mixer $M_1$ is applied to a tap on a master delay line MD. The micro-processor 2 selects the number of the tap closest to the ideal delay and places it in the RAM 4, and the tap selector 12 selects the tap that it is instructed to select by the RAM 4. If the delays thus selected for each transducer were ideal, the sinusoids of the electrical pulses from each transducer would be cophasal at the end of the delay line MD. If an error in phase of 22.5 degrees could be tolerated, the taps would have to be spaced at points separated by one-sixteenth of the period of the waves being delayed. This would be nearly impossible to attain if the outputs of the transducer were applied directly to the taps because the frequency involved would be several megacycles.

The number of taps and the expense thereof can be significantly reduced by using a mixer such as $M_1$ to heterodyne the signals from the transducer to a much lower IF frequency as described in the aforesaid patent. And, as also described in that patent, a further significant reduction can be made in the number of taps by spacing them so that the envelopes of the pulses from each transducer arrive at the end of the delay line with some overlap. The fact that the sinusoids in the pulses would therefore no longer be cophasal is taken care of by adjusting the phase of the IF wave supplied by the mixer $M_1$. The mixer $M_1$ is supplied with one of numbered discrete phases of the output of an oscillator $O_1$. The number of the phase that is closest to an ideal phase is supplied by the microprocessor 2 to the RAM 4 and a phase selector 14 applies this phase to the mixer $M_1$. If the taps on the master delay line MD are perfectly located, the only phase error would be due to the fact that the mixer $M_1$ can only operate at a discrete phase. While the reflections of each pulse are being received from different depths, the tap of the master delay line MD is left unchanged; but the phases selected by the phase selector 14 are changed a number of times in order to keep the sinusoids focussed, i.e., reasonably close to a cophasal relationship.

From this, it can be seen that any error in tap location will cause an error in the phase of the sinusoids at the end of the master delay line MD. In order to avoid this, the tolerance of the tap location has been kept tight, but this is expensive.

In order to reduce the tolerance required and decrease the expense in accordance with this invention, the following circuit elements are provided. The output of a test oscillator $O_2$ is energized by command from the microprocessor 2. The output of $O_2$ is connected to the input of the amplifier 10 and to one input of a phase detector PD. A mixer $M_2$ is connected between the end of the master delay line MD and the other input of the phase detector PD. The local oscillator $O_1$ that was coupled to the phase selector 14 for the mixer $M_1$ is also coupled to the mixer $M_2$ so as to make the frequency of the oscillations provided to the phase detector PD from the mixer $M_2$ the same as the frequency of the test oscillator $O_2$. The output of the phase detector PD is applied via an A/D device 20 to the microprocessor 2. During the test procedure, the microprocessor 2 sets the phase selector 14 at some predetermined phase and causes the tap selector 12 to connect the output of the mixer $M_1$ to all of the taps on the master delay line MD in succession.

As the phase indication for each tap is received from the A/D device 20, the microprocessor 2 determines the difference between it and the ideal value and outputs to the RAM 4 the number of the phase that is closest to the value that should be used in order to attain the desired degree of phase coherence. These numbers are stored in the RAM 4 and control the phase of the oscillator $O_1$ that is applied to the mixer $M_1$.

In the event that a selected tap on the master delay line MD is so erroneously located that its delay is in error such that the desired pulse envelope overlap is not attained, the quality of the image would be reduced because an insufficient number of sinusoids would be added together. This would require a change in tap as well as the probable selection of a different phase for the mixer $M_1$. If the spacing between taps is not greater than one cycle of IF frequency, the accumulation of the phase errors would indicate the number of cycles of error in the delay and could be used by the microprocessor 2 to select a different tap.

What is claimed is:
1. An ultrasonic system comprising
   an array of transducer elements,
   means coupled to said transducer elements for causing them to periodically transmit bursts of ultrasonic carrier pressure waves in respectively different directions,
   phase shifters having inputs and outputs, said inputs being respectfully coupled to said transducer elements,
   a master delay line having a plurality of input taps and an output,
   tap selection means for respectively connecting the outputs of said phase shifters to selected taps on said master delay line, the delay between at least some of said taps and the output of said delay line having errors so as to be different from desired values,
   a memory in which an indication of the error in delay for each tap is stored, and
   means for adjusting the phase provided by each of said phase shifters as required for range focussing in such manner as to compensate for the error in delay of the tap that is stored in said memory.

2. A system as set forth in claim 1 having means respectfully coupled to one of said phase shifters and to the output of said delay line for deriving an indication of the error in delay for each tap and storing each indication in said memory.

3. A system as set forth in claim 2 wherein said means for deriving indications of the error in delay for a tap includes,
   one of said phase shifters having a first mixer having two inputs and an output,
   a test oscillator coupled to one of said latter input,
   a second oscillator,
   phase adjusting means being coupled between the other input of said first mixer and said second oscillator,
   a second mixer having two inputs and an output,
   means for coupling one of said inputs of said second mixer to the output of said master delay line,
   means for coupling the other input of said second mixer to said second oscillator,
   phase detecting means for deriving at an output thereof an indication of the difference in phase between alternating current voltage waves respectively applied to two inputs thereof,
   means for coupling one of said latter inputs to said test oscillator,
   means for coupling the other of said latter inputs to the output of said second mixer, and
   means for storing in said memory indications of phase difference that appear at the output of said phase detecting means.

* * * * *